(12) United States Patent  
Rumph

(10) Patent No.: US 12,172,583 B2  
(45) Date of Patent: Dec. 24, 2024

(54) TAILGATE TOOLBOX

(71) Applicant: Zacharia Rumph, Canton, MI (US)

(72) Inventor: Zacharia Rumph, Canton, MI (US)

( * ) Notice: Subject to any disclaimer, the term of this patent is extended or adjusted under 35 U.S.C. 154(b) by 0 days.

(21) Appl. No.: 18/016,667

(22) PCT Filed: Jul. 18, 2020

(86) PCT No.: PCT/US2020/042694  
§ 371 (c)(1),  
(2) Date: Jan. 17, 2023

(87) PCT Pub. No.: WO2022/019872  
PCT Pub. Date: Jan. 27, 2022

(65) Prior Publication Data  
US 2023/0286448 A1   Sep. 14, 2023

(51) Int. Cl.  
*B60R 11/06*   (2006.01)  
*B25H 5/00*   (2006.01)  
*B60N 3/00*   (2006.01)

(52) U.S. Cl.  
CPC ............... *B60R 11/06* (2013.01); *B25H 5/00* (2013.01); *B60N 3/001* (2013.01)

(58) Field of Classification Search  
CPC ............ B60R 11/06; B25H 5/00; B60N 3/001  
See application file for complete search history.

(56) References Cited

U.S. PATENT DOCUMENTS

| | | |
|---|---|---|
| 3,614,136 A | 10/1971 | Dent |
| 5,186,510 A | 2/1993 | Stapp |
| 5,398,987 A | 3/1995 | Sturgis |
| 5,518,158 A * | 5/1996 | Matlack ............. B62D 33/0273 224/403 |
| 5,575,521 A | 11/1996 | Speis |
| 7,309,093 B2 | 12/2007 | Ward |
| 7,628,439 B1 * | 12/2009 | Strong ............... B62D 33/0273 296/57.1 |
| 9,193,290 B2 * | 11/2015 | Lazarevich ............... B60P 3/14 |
| 9,308,947 B2 * | 4/2016 | Kmita ..................... B60R 11/06 |
| 9,926,018 B2 * | 3/2018 | Spahn ..................... B60R 5/041 |
| 10,106,208 B2 * | 10/2018 | Barrios Albert .......... B60R 3/02 |

(Continued)

FOREIGN PATENT DOCUMENTS

GB   2602937 A *   7/2022   ............. B60N 2/005

*Primary Examiner* — Drew J Brown  
(74) *Attorney, Agent, or Firm* — Singh Law Firm PLLC; Gautam B. Singh

(57) ABSTRACT

A tailgate toolbox is disclosed wherein a toolbox is adapted to slide and be encased within the tailgate hutch of a vehicle, such as a pick-up truck. The tailgate hutch generally being made with material that is strong and durable to protect the cargo space, the toolbox stored therein stays protected and may be built with lighter material further making it portable. Additionally, a cavity in the tailgate hutch provides space that is otherwise wasted and thus storing a toolbox therein takes up no additional space. Furthermore, securely encased within the tailgate hutch, the toolbox stays secure and prevents its theft. The toolbox disclosed includes pre-designed compartments for storing standard tools to prevent rattling as the cargo vehicle sometimes moves through rough terrain. The toolbox also includes a handle to enable it to be easily pulled out of or stowed back into the cavity of the tailgate hutch.

20 Claims, 10 Drawing Sheets

(56) References Cited

U.S. PATENT DOCUMENTS

| | | | |
|---|---|---|---|
| 10,308,292 B1* | 6/2019 | Shedden | B62D 33/0273 |
| 11,071,409 B2* | 7/2021 | Collins | H01M 10/655 |
| 2012/0325877 A1* | 12/2012 | Franks | B60R 11/06 |
| | | | 224/404 |
| 2014/0054339 A1* | 2/2014 | Smith | B60P 3/14 |
| | | | 224/404 |
| 2018/0009487 A1* | 1/2018 | Astrike | B60P 7/02 |
| 2018/0056842 A1* | 3/2018 | Miranda Nieto | B60P 1/435 |
| 2020/0290525 A1* | 9/2020 | Viniegra | B60R 11/06 |
| 2023/0234649 A1* | 7/2023 | Stephan | B62D 33/0273 |
| | | | 296/57.1 |

* cited by examiner

TAILGATE TOOLBOX

TECHNICAL FIELD

The field of the invention relates to cargo vehicles, particularly to pickup trucks, with a detachable, portable toolbox being housed within a cavity of the tailgate hutch and includes capability for charging and being used as a worktable.

BACKGROUND

It is a primary purpose of the invention to provide a toolbox adapted to be included within the cavity of a tailgate hutch of a cargo vehicle. The toolbox is further including legs that can be extended out to create a worktable and can be folded up to be rolled away.

This invention pertains to toolboxes adapted to be included within the cavity of the tailgate of pickup or a cargo truck. Truck toolboxes are known in the art and typically comprise a box which is attached to the cab or the cargo area truck, or to the sidewalls of a pick-up truck. In such a configuration they use up and occupy space in the valuable cargo area. Further, given the location of these toolboxes being within the cargo area, this often requires climbing into the cargo area and carrying an often heavy toolbox, the toolbox weight being that of the toolbox itself and the tools contained therein, outside the cargo area and down from the pickup truck.

What is needed is a toolbox that does not occupy any space in the cargo area. What is needed is a toolbox that is easy to remove from and detach from its location and be equipped with some apparatus that can facilitate with its transportation. What is also needed is toolboxes be portable so that they can be easily taken along to the actual work location or construction sites from the location where the vehicle is parked.

Previous systems are designed to make the toolbox with sturdy and heavy materials. This allows the toolbox to be kept in the cargo area and be sturdy and thick enough to withstand the pressures of cargo being hauled that may need to be stacked over the toolbox. This further creates a disadvantage in portability of the toolbox. What is needed is that a hard-protective casing be utilized for protecting the toolbox, but that does not does not need to be carried along with the toolbox.

Previous systems include simple fold away tables and other types of platforms that extend from the trunk of a car, or the side or back of a truck, to allow eating, food preparation, and-other activities. There are also several types of tool storage boxes and work benches that attach to the front or rear of a car or truck that are used by the various trades. What is needed is a single apparatus that is a combination apparatus not only provides an ability to store tools but also adaptable to provide a table or a working area where the tools may be used in for working on projects that utilize the tools.

Furthermore, what is needed is toolbox that does not use up any cargo surface area thereby diminishing the capacity of the vehicle and negatively impacting the primary purpose of the vehicle itself. When the toolbox is attached to the walls of the main cargo area, and the vehicle is stacked with cargo, the toolbox becomes inaccessible requiring the cargo to be removed to access any tools. What is needed is a toolbox that remains accessible despite the amount of cargo being carried by the vehicle.

What is needed is an ability to secure the toolbox in a location where it stays hidden and away from the sight of thieves looking to steal the expensive or professional grade tools stored in the toolbox.

What is needed in a toolbox is an ability to charge any power tools located within the toolbox. What is needed is that the tools get charged while they are stored in a toolbox so that when a vehicle reaches its destination, the tools are charged and ready to be used being charged while the cargo vehicle is en route to the work-site.

What is needed is the capability to charge tools directly from the battery power of the vehicle. It is therefore desirable for the toolbox to provide the capability of having any of the tools for getting plugged in and charged from outlets included within the toolbox that are electrically powered by the cargo vehicle's battery. Another desirable feature needed is the ability for tools to be cushioned in the toolbox so as to minimize the rattling of the metal tools as while the cargo vehicle is in motion. Such an apparatus should allow for the storage of any tools in addition to the storage of a standard tool set.

SUMMARY

The above and other preferred features, including various novel details of implementation and combination of elements will now be more particularly described with reference to the accompanying drawings and pointed out in the claims. It will be understood that the particular methods and implementations described herein are shown by way of illustration only and not as limitations. As will be understood by those skilled in the art, the principles and features described herein may be employed in various and numerous embodiments without departing from the scope of the invention.

It is appreciated by one skilled in the art that the tailgate hutch of a cargo vehicle includes a cavity which the tailgate toolbox utilizes for storing by encasing therein a toolbox adapted to fit into that cavity. It is thus an objective for the tailgate toolbox is to be stored in a cavity where it does not use up any of the cargo space leaving it completely available for the storage of the cargo. Further, being enclosed and encased in the cavity area, the tailgate toolbox is stored securely and protected from damage, vandalism or theft of any tools stored therein.

An apparatus is disclosed comprising a tailgate hutch including a cavity wherein the cavity has an opening, and the cavity is configured to contain a toolbox, and a toolbox configured to be contained within the cavity. Embodiments of the tailgate toolbox apparatus comprise the opening of the tailgate cavity having a detachable cover. Embodiments of the tailgate toolbox apparatus comprise of the detachable cover having a locking mechanism configured to lock and secure the cover over the opening. Embodiments of the tailgate toolbox apparatus comprise the toolbox having an interior and further including a lid configured to be in an open position making the interior accessible, or a closed position with the interior becoming inaccessible. An embodiment of the tailgate toolbox apparatus has the toolbox further including a locking mechanism adapted to fixedly secure the lid in a closed position.

Embodiments of the tailgate toolbox apparatus comprise the toolbox including a plurality of supports configured to hold the toolbox in an elevated position above ground, wherein the supports comprise of a plurality of extendable legs configured to change the elevation level of the toolbox above ground.

Embodiments of the tailgate toolbox apparatus comprise the toolbox including a plurality of charging ports. Embodiments of the tailgate toolbox apparatus comprise toolbox including a plurality of attachments configured to facilitate portability of the toolbox, wherein the plurality of attachments for facilitating portability comprise of a set of wheels or an extendable handle or both.

The tailgate toolbox can be adapted to fit into the cavity of the tailgate of a cargo vehicle like a pickup truck. In such a configuration, the toolbox is protected by the walls of the tailgate. Thus, the toolbox can be constructed with a lighter material which in turn makes it easily transportable. Furthermore, as the tailgate toolbox does not come in the way of storing cargo, and as such it does not interfere with the storage of cargo which often requires that cargo be fully stacked for complete utilization of the area. Moreover, even when the cargo fully occupies the cargo area of the vehicle, the tailgate toolbox disclosed herein remains fully accessible.

It is further an object of the invention to make the tailgate toolbox easily accessible from outside the cargo vehicle. The location of the toolbox being towards the rear of the vehicle offers a unique advantage. It makes it easy for a human to pull the toolbox out of the cavity while standing on the ground at the rear of the vehicle. It is an object of the invention to make the tailgate toolbox easy to remove from its cavity and be rolled to a work location. As disclosed, this is accomplished by including telescopic extend-able carry handle on the toolbox and also including a plurality of wheels or similar rolling or sliding elements enabling and facilitating its movement.

It is a further feature that the tailgate toolbox cover is made in a plurality of distinct sections, or with no sections at all. The toolbox slips into the tailgate cavity and is equipped with a handle that allows it to be pulled out. The section of the toolbox that is laterally opposite to the handle also includes a rolling apparatus, such as wheels, that allow the toolbox to be rolled and thus be easily transportable. It is further a feature of the toolbox handle that is adapted to be pulled out so that the entire toolbox may be easily transported like a piece of luggage.

It is also an object of the invention to create a worktable with the tailgate toolbox partially pulled out. The portion of the tailgate toolbox that is pulled out has a plurality of telescopic legs that are folded and tucked under the surface allowing the tailgate toolbox to be inserted into the tailgate cavity. It is the object of the invention to enable the toolbox cover to also serve the purpose of providing a workbench area. Thus, when the tailgate toolbox is partially out with its telescoping legs unfolded and resting on the ground, a work surface is created. Further, when a sectional toolbox configuration is utilized, the work surface is supplemented by having a supply of tools readily available underneath, where furthermore, a subset of sections may remain open providing access to tools while the remaining sections provide the worktable surfaces.

It is further an object of the invention to enable storage and charging of tools while they are in the toolbox. The location of the toolbox being in the tailgate enables electrical conductors from the cargo vehicle's battery to run along with the electrical conductors that run from the battery to the taillights of the cargo vehicle. The inside of the tailgate cavity includes electrical couplings which get engaged when the tailgate toolbox is fully inserted into its storage cavity within the tailgate hutch. Thus, a source of power originating from the cargo vehicle's battery is communicated to the inside of the toolbox. The inside of the tailgate toolbox provides a plurality of receptacles for charging any plurality of tools stored therein.

Embodiment of the tailgate toolbox comprise in combination, a system, which includes a vehicle tailgate hutch that is attached to a vehicle and which combination comprises a vehicle having a tailgate hutch attached thereto, the tailgate hutch having an exterior and an interior where the exterior is attached to a vehicle, the interior includes a toolbox cavity configured to accommodate a toolbox; the toolbox adapted to be enclosed within the toolbox cavity; the exterior further including an opening in communication with the interior; where the opening is configured to enable a conveying of the toolbox into and out of the toolbox cavity.

Embodiment of the tailgate toolbox system comprise, the tailgate hutch further including a rear surface having an upper edge and a lower edge, a front surface having an upper edge and a lower edge, where the front surface and the rear surface are disposed substantially parallel to each other and configured to create a tailgate cavity therein; the upper edge of the front surface and the upper edge of the rear surface are configured to provide the opening for conveying the toolbox into and out of the toolbox cavity; the lower edge of the front surface or the lower edge of the rear surface hingeably attached to the cargo bed.

An embodiment of the tailgate toolbox system comprise a toolbox further comprising a front face, a rear face, a top face, a bottom face, a left face and a right face, wherein the rear face is proximal and approximately perpendicular to each of the left face, right face, the top face and the bottom face, the front face is proximal and approximately perpendicular to each of the left face, right face, the top face and the bottom face, the front face and the rear face are distally separated and approximately parallel to each other, the proximal faces being detachably or fixedly coupled to each other, the front face, the rear face, the bottom face, the top face, the left face and the right face constructively enclose a toolbox interior; and where upon encasing the toolbox within the tailgate cavity, the rear face of the toolbox is adjacent to the rear surface of the tailgate cavity, and the front face of the toolbox is adjacent to the rear surface of the tailgate cavity.

An embodiment of the tailgate toolbox system includes the tailgate bottom having a plurality of snapping means that are configured to engage with a plurality of complementary snapping means located on the bottom face of the toolbox. An embodiment of the tailgate toolbox system includes the left side surface and the right side surface of the tailgate hutch each have a plurality guides; the left side face and the right side face of the toolbox include a plurality of guides; wherein the tailgate hutch guides and the toolbox guides are complementary to each other; and tailgate hutch guides and the toolbox guides are configured guide the conveying the toolbox into and out of the toolbox cavity.

Embodiment of the tailgate toolbox system has the rear face or the front face is further split into a plurality of sections. An embodiment of the system has the front face of the toolbox includes plurality of supports.

Embodiment of the tailgate toolbox system has the toolbox which includes a plurality of charging plugs configured to supply electric power.

Embodiment of the tailgate toolbox system has the toolbox further including a plurality of wheels and handle, wherein handle are configured to telescopically distend and communicate any force applied to the handle onto the toolbox thereby causing the wheels to roll and cause the toolbox attached to the wheel to move.

The application discloses a process of including a toolbox within a tailgate comprising having tailgate hutch attached to a vehicle; having a tailgate hutch include a toolbox cavity therein, where the toolbox cavity is configured to accommodate a toolbox; having a toolbox configured to be enclosed within the toolbox cavity; and inserting the toolbox into the toolbox cavity.

It is further an object of the invention to provide confining storage locations of a plurality of tools therein. Tools of predetermined size and shaped are set into the predefined storage locations within the toolbox. This enables the tools to stay stationary as the cargo vehicle moves rather than rattle and move around unrestrained. Further, it is also an object of the invention to enable the storage of objects and tools of any size in open compartments of a plurality of sizes to prevent their free movements and rattling and also further restrain their movements through some external means as such by including complementary pieces of foam as a cove.

BRIEF DESCRIPTION OF DRAWINGS

The invention will be described in conjunction with the attached drawings in which referenced numerals designate elements, and wherein.

FIG. 9-A illustrates the toolbox guided down to the complementary parts on the tailgate bottom; and FIG. 9-B illustrates the configuration when toolbox has been secured to the tailgate's bottom;

FIG. 10-A illustrates the toolbox having the receptacle snap sockets complementary to the snap fasteners fixedly mounted on the tailgate bottom; and FIG. 10-B illustrates the configuration when toolbox has been secured to the tailgate's bottom with the snap fastener and snap sockets engaged.

DETAILED DESCRIPTION

Figure 1:
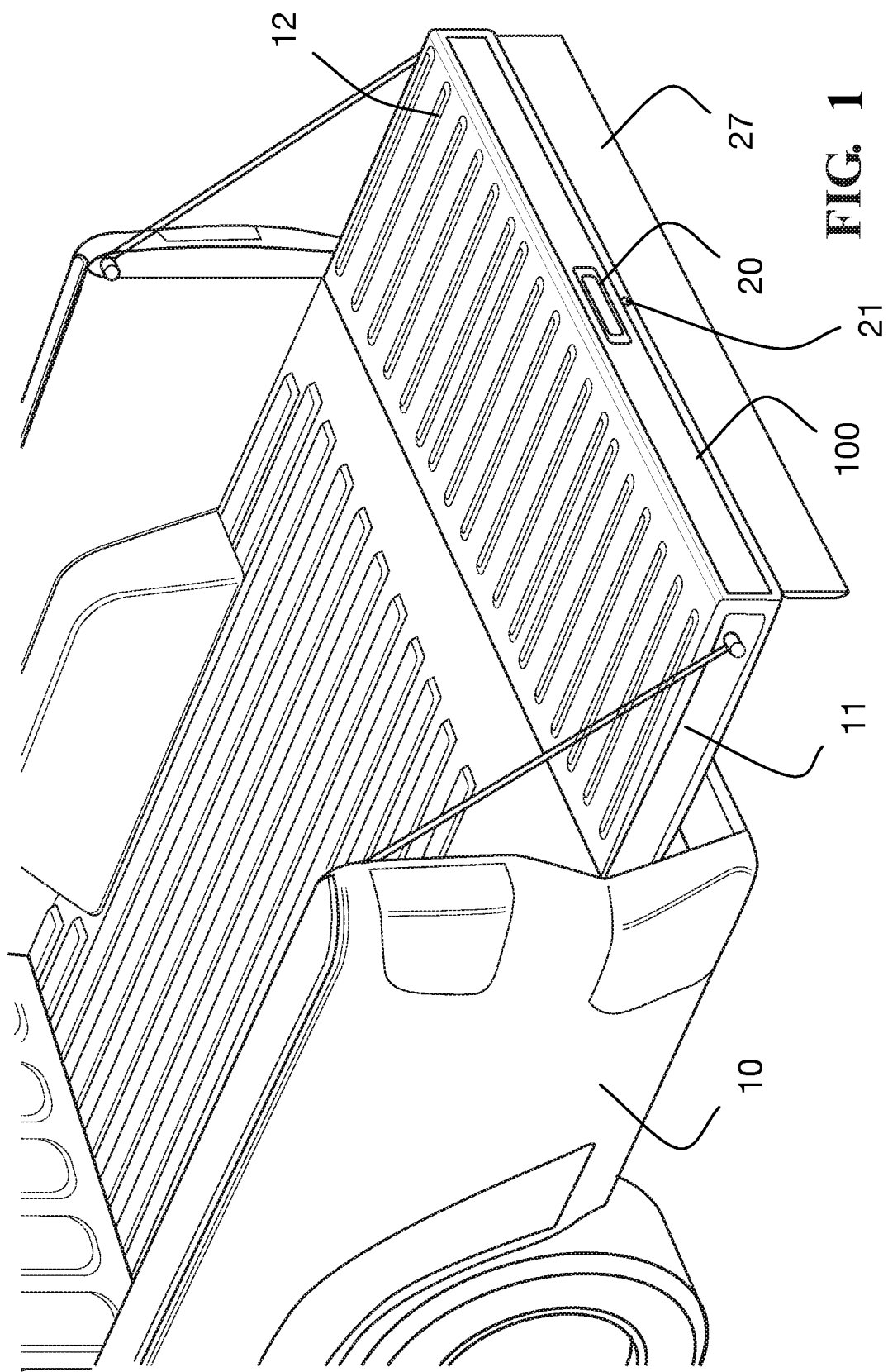
FIG. 1 shows an embodiment of the invention where the tailgate toolbox is as wide as the width of a cargo vehicle's tailgate and has been inserted into the tailgate cavity.

The arrangement in FIG. 1 shows an embodiment of the invention where the tailgate toolbox is as wide as the width of a cargo vehicle's tailgate and has been inserted into the tailgate cavity. Illustrated in FIG. 1 is typical Cargo Vehicle 10 such as a Pickup Truck which has a Tailgate Hutch 11 or a hinged flap at the back of a truck that can be lowered and made to come in level with the cargo area to facilitate loading and unloading of the cargo, or may in some instances be completely removed for facilitating in the loading or unloading of cargo into the vehicle.

The Tailgate Hutch 11 has a Tailgate Shell 12 which is typically a metal shell that forms the tailgate of the vehicle creating a cavity therein. This cavity exists in a natural course of manufacturing a cargo vehicle such as a pick truck. As disclosed by this application, the cavity is further adapted to accommodate a toolbox therein. Such a configuration, or combination is shown in FIG. 1, where Tailgate Shell 12 includes a Tailgate Toolbox 100 therein. As further shown in FIG. 1, the Tailgate Toolbox 100 includes a Handle 20 which is adapted to insert and pullout the toolbox from the tailgate cavity. Also included is a Toolbox Lock 21 which is a lock that secures and protects the contents of the toolbox which could contain expensive tools of professional grade. Also shown is the use of a Tailgate Cover 27 which is a protective covering for securing the Tailgate Toolbox 100 within the Tailgate Hutch 11. The Tailgate Cover 27 also includes a locking mechanism for securing the cover to the Tailgate Hutch 11. Furthermore, the Tailgate Cover 27 is designed to match the cargo vehicle trim to maintain uniformity with the covers used on the sidewalls of the cargo vehicle.

The embodiment of the system shown in FIG. 1 shows the Tailgate Hutch 11 cavity as occupied by the Tailgate Toolbox 100. The Tailgate Shell 12 of the Cargo Vehicle 10 is typically built with solid and strong sheet metal to provide it with overall high level of strength and durability that enables the Cargo Vehicle 10 to perform its various functions. Typically, the sheets are formed and molded as a rectangular prism such that a cavity is created to provide an exterior thickness of the tailgate. The Tailgate Toolbox 100 is adapted to be inserted into this cavity. Embodiments of the invention have the Tailgate Toolbox 100 being built with lightweight material such as aluminium, tin, reinforced plastics, fiberglass, or combinations thereof.

Once inserted, Tailgate Toolbox 100 is locked into place by the locking mechanism of Tailgate Cover 27. This, in addition to the Toolbox Lock 21 (which is integrated into the Tailgate Toolbox 100) protects the Tailgate Toolbox 100 against theft and keeps it snapped in place. A skilled artisan will appreciate that such a firm snapping provided by the Tailgate Cover 27 enables the charging ports to stay activated which are integrated into Tailgate Toolbox 100 as discussed below. After the Tailgate Toolbox 100 is snapped in place, the strong electrical coupling to a battery is achieved in an embodiment of the system used for charging any power tools stored therein.

Figure 2:
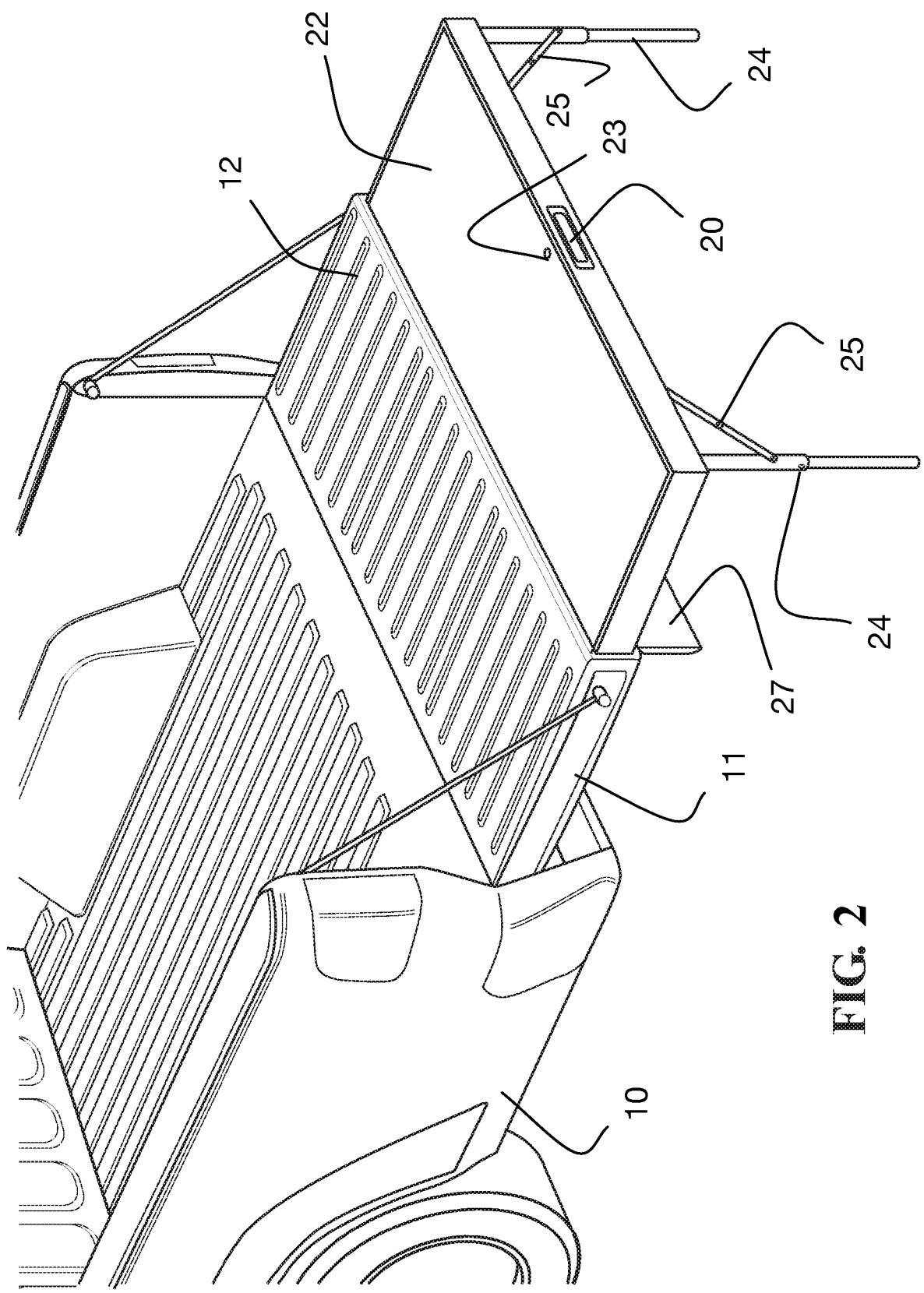
FIG. 2 shows an embodiment of the invention where the tailgate toolbox has been pulled out of the tailgate cavity and its legs have been distended to create a table for workspace.

The illustration in FIG. 2 shows an embodiment of the invention where the tailgate toolbox has been pulled out of the tailgate cavity and its legs have been distended to create a table for workspace. Illustrated in FIG. 2 is an embodiment of the invention where the top surface of the Tailgate Toolbox 100 is being used as a workspace. This enables the tools to be effectively used on a work surface in certain applications and situations where this is required. As illustrated, the Worktable 22 is a work-space table created by the top cover of the Tailgate Toolbox 100. The Worktable 22 includes Latch Lift 23 which is a latch for securing the table as well as adapted to serve as a handle for lifting and closing the top lid of the Tailgate Toolbox 100. The Worktable 22 is further supported by plurality of Telescopic Legs 24 which are adapted to extend out and provide support so that the top cover of the Tailgate Toolbox 100 may be used as a work-space table and to stay leveled with the cargo bed.

The Telescopic Legs 24 are further attached to Folding Apparatus 25 which is adapted to enable the folding of the toolbox legs to be lined up and plush with the bottom surface of toolbox to allow it to be inserted into the tailgate cavity. In this manner, the Worktable 22 and the flattened Tailgate Hutch 11 together provide a larger work area. Furthermore, by making the height of the Worktable 22 adjustable, the Telescopic Legs 24 can rest on another solid surface such as a step which may not necessarily be in line with the ground on which the vehicle's wheels are resting. Additionally, the height adjustments of Telescopic Legs 24 enable the use of different sized wheels to be installed as is sometimes the case when pickup trucks work on uneven terrains.

Figure 3:
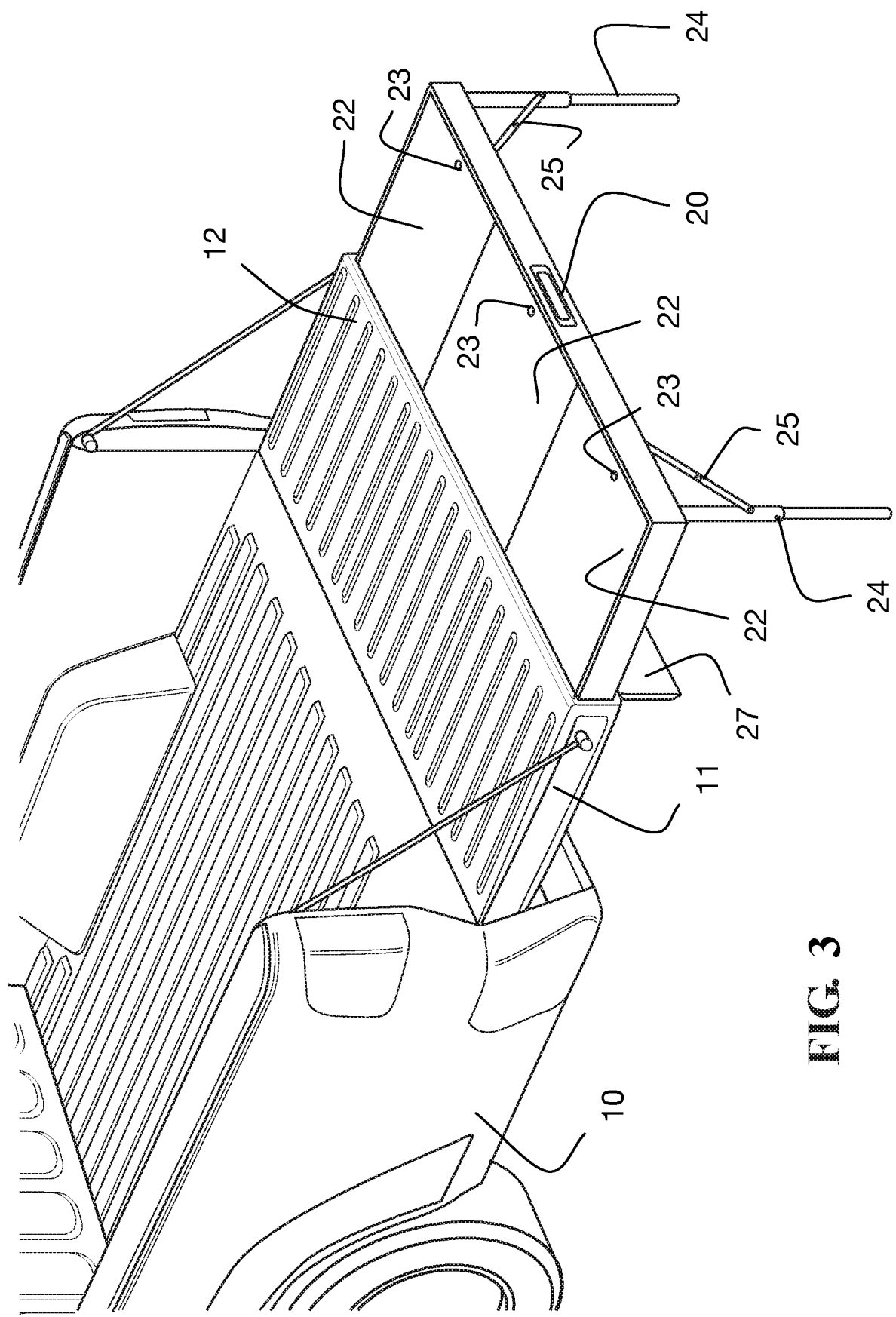
FIG. 3 shows an embodiment of the tailgate toolbox where the width of the toolbox is approximately a third of the width of a cargo vehicle's tailgate.

The illustration in FIG. 3 shows an embodiment of the tailgate toolbox where the width of the toolbox is approximately a third of the width of a cargo vehicle's tailgate. In the embodiment of the invention shown, the Tailgate Toolbox 100 comprises of three sections. The embodiment illustrated allows for the ability of the toolbox to be sectioned so that different tools can be stored in a compartmentalized fashion into different toolboxes. Furthermore, with such a compartmentalization, a section of the Tailgate Toolbox 100 can be held open while the remaining sections remain closed and serve as a Worktable 22. The open sections of the Tailgate Toolbox 100 make the frequently used tools easily accessible for the specific job at hand. Each of the plurality of sections of the Tailgate Toolbox 100 also includes a Latch Lift 23 in an embodiment of the system.

Figure 4:
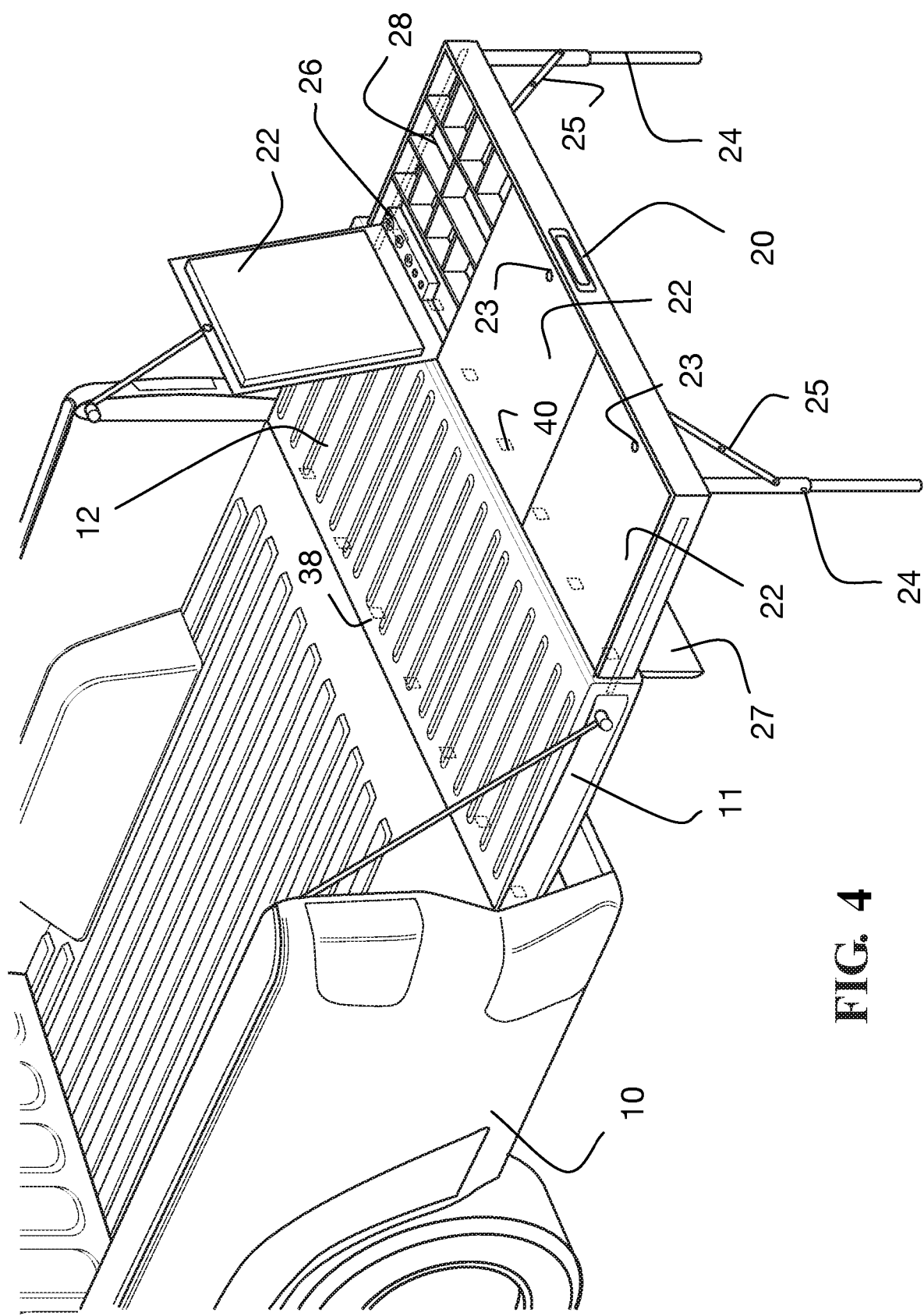
FIG. 4 shows an embodiment of the tailgate toolbox with its lid in an open configuration and the toolbox interior containing electrical outlets for charging mobile phones and tools requiring electrical charging apparatus.

The illustration in FIG. 4 shows an embodiment of the tailgate toolbox with its lid in an open configuration and the toolbox interior containing electrical outlets for charging mobile phones and tools requiring electrical charging apparatus. The embodiment of the invention shown includes the Electrical Charging Outlets 26 which is a plurality of electrical outlets for charging any power tools or other accessories stored in the toolbox. Also illustrated in the embodiment shown in General Storage Area 28 which is for storing non standardized items stored in the toolbox.

In an embodiment of the system the Electrical Charging Outlets 26 are powered by electrically coupling them to the vehicle's battery. In an embodiment of the system, the Electrical Charging Outlets 26 module includes a rechargeable battery which gets charged when the Tailgate Toolbox 100 is inside the Tailgate Hutch 11. Therefore, when the Tailgate Toolbox 100 is removed from the Tailgate Hutch 11 and transported for use away from the vehicle, the rechargeable battery in the Electrical Charging Outlets 26 of the Tailgate Toolbox 100 provide a temporary source of electrical power.

Figure 5:
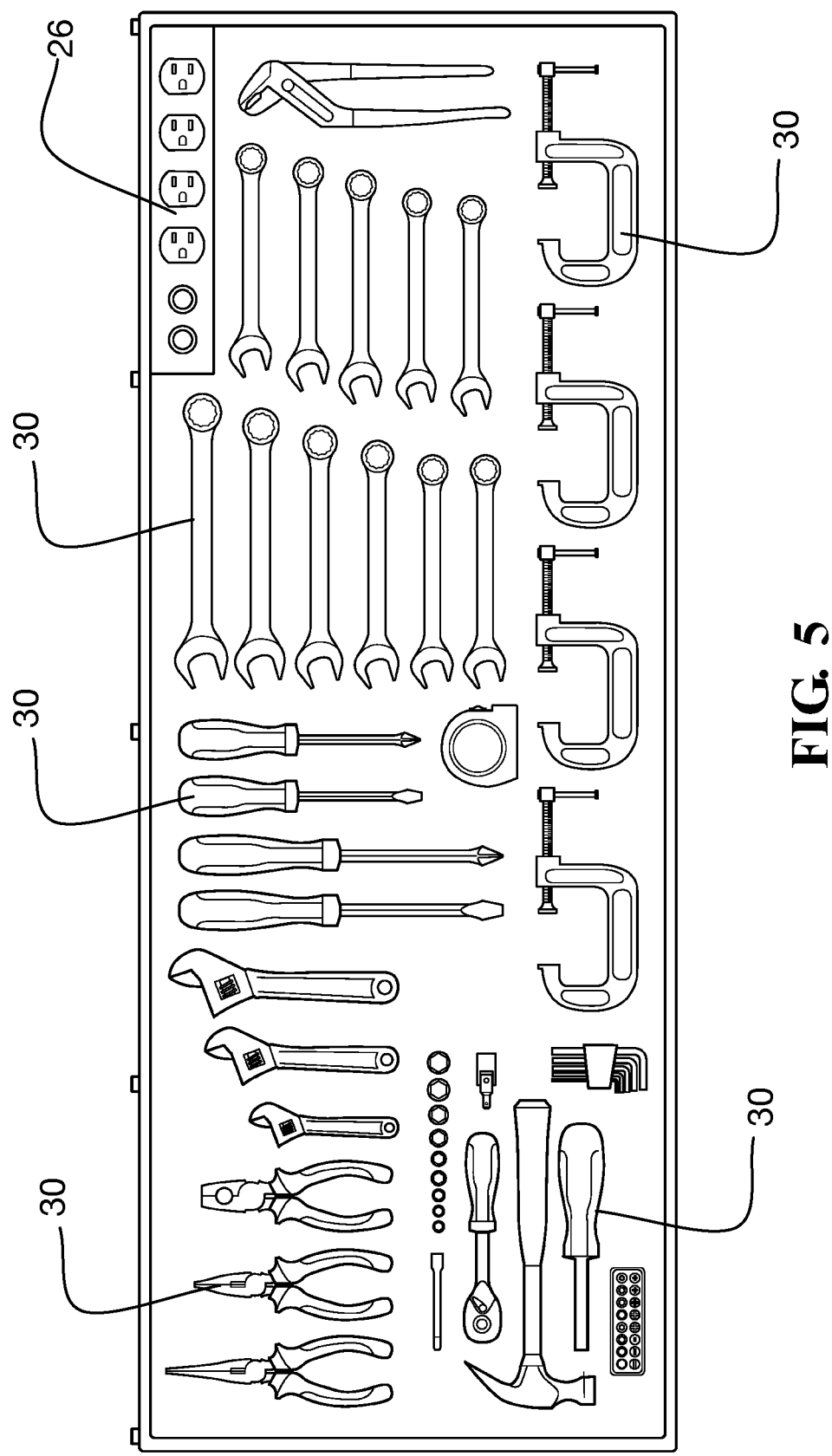
FIG. 5 illustrates a view of the tailgate toolbox showing a plurality of tools included in therein.

The illustration in FIG. 5 illustrates a view of the tailgate toolbox showing a plurality of tools included in therein. FIG. 5 depicts Standardized Tools Holder 30 which is includes standardized sections that are adapted to securely store tools of predetermined shape and size. A plurality of tools is shown in the embodiment of the invention.

It will be appreciated by a person skilled in the art that in addition to designing Tailgate Toolbox 100 with Standardized Tools Holder 30, materials such as foam may also be utilized to further prevent rattling of tools as the cargo vehicles move often over uneven terrain such as a construction site. It will be further appreciated by a skilled artisan that the use of cushioning materials will particularly be useful in storing tools and other parts in the non-standard size and shape containers, i.e. General Storage Area 28, which are also integrated with in the Tailgate Toolbox 100, as illustrated in FIG. 4.

Figure 6:
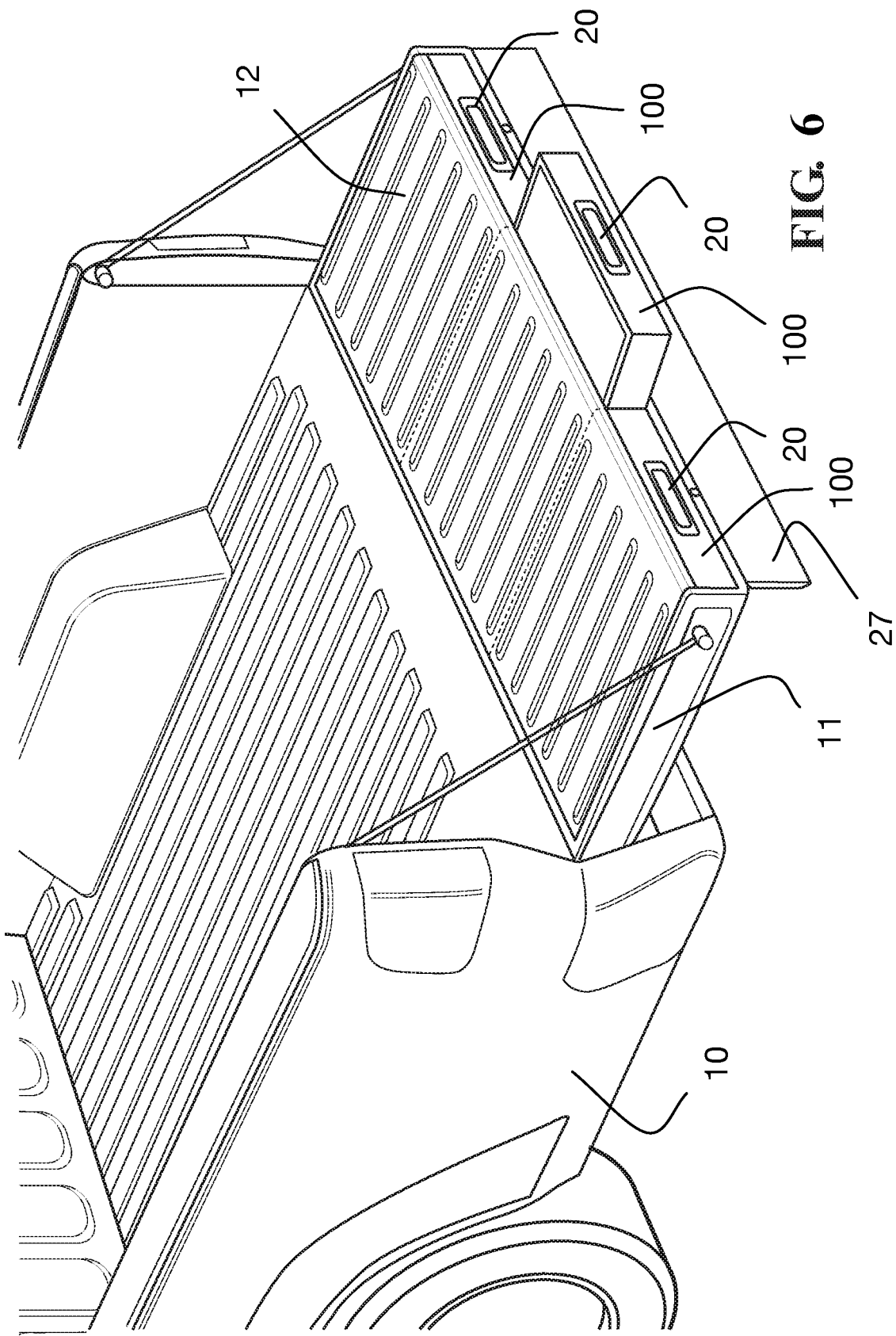
FIG. 6 shows an embodiment of the invention showing the tailgate toolbox approximately one third of the width of the tailgate.

The illustration in FIG. 6 shows an embodiment of the invention showing the tailgate toolbox approximately one third of the width of the tailgate. In an embodiment of the invention shown the Tailgate Toolbox 100 is sectioned into three separate toolboxes in order to facilitate transportation of the toolbox. Each of the sectioned toolbox includes a separate Handle 20 and can be pulled in or out and be transported easily.

The embodiment of the invention shown in FIG. 6 shows the Tailgate Toolbox 100 as being approximately one third as wide as the width of the tailgate of Cargo Vehicle 10. Each of the smaller toolboxes in the embodiment shown has a Handle 20. The individual smaller toolboxes are amenable to transportation. Additionally, the individual sections provide the ability for easier access to tools while the Tailgate Toolbox 100 has been pulled out and being used as a Worktable 22. The item can be held on the workspace and sections of the Tailgate Toolbox 100 may be opened to access any tools required.

Figure 7:
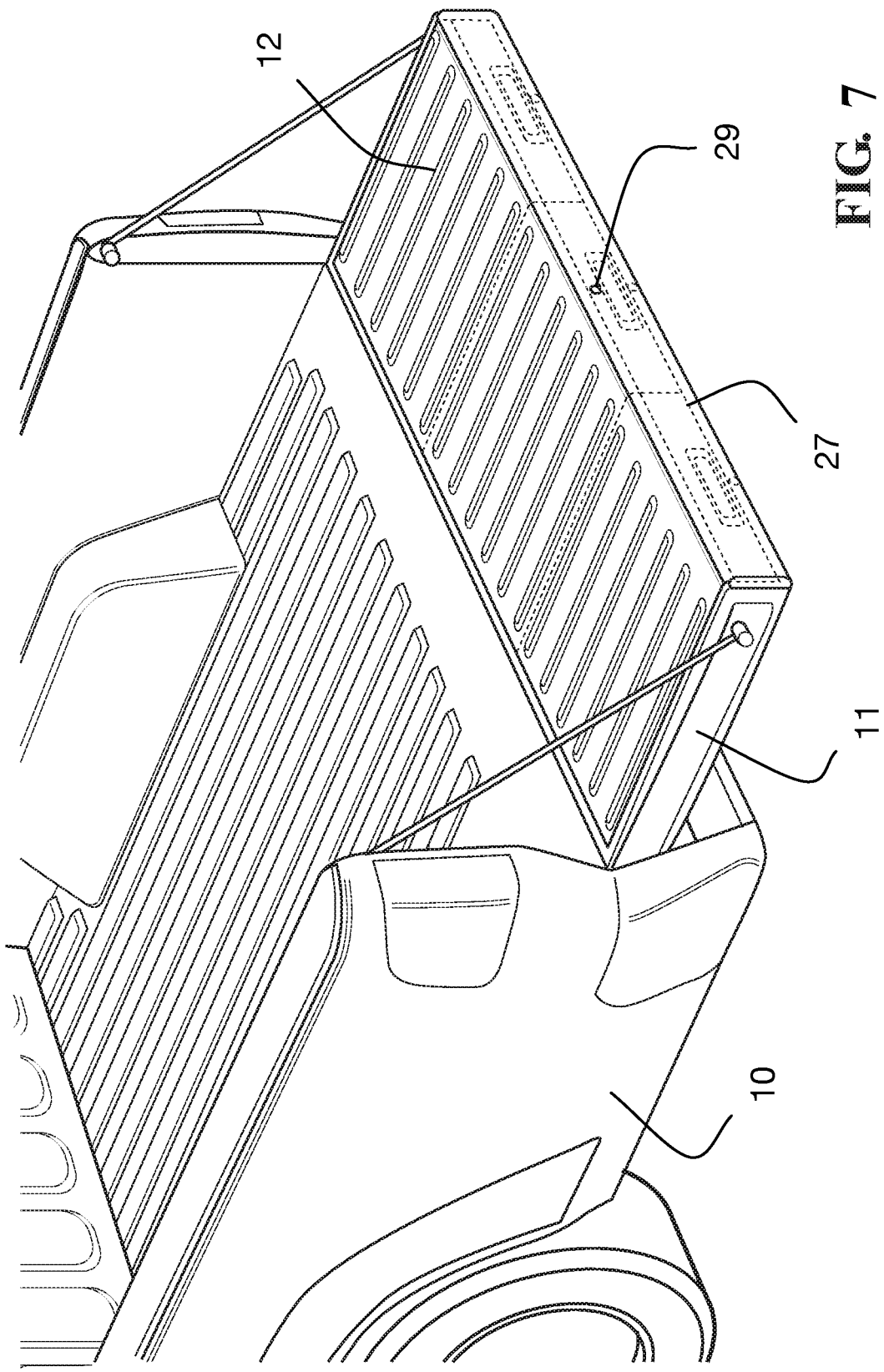
FIG. 7 shows an embodiment of the invention showing the tailgate toolbox with the tailgate cover engaged and locked.

The illustration in FIG. 7 shows an embodiment of the invention showing the tailgate toolbox with the tailgate cover engaged and locked. In an embodiment of the invention shown the Tailgate Toolbox 100 is secured and covered within the tailgate cavity with a Tailgate Cover 27 which is a cover for protection of tailgate toolbox stored in the tailgate cavity. The figure further shows that the Tailgate Cover Lock 29 which is a lock for the Tailgate Cover 27 for securing the tailgate toolbox stored within the tailgate cavity. The Tailgate Cover 27 also serves the function of making the tailgate plush with the plastic lining that is generally used to cap the top of cargo walls.

Figure 8:
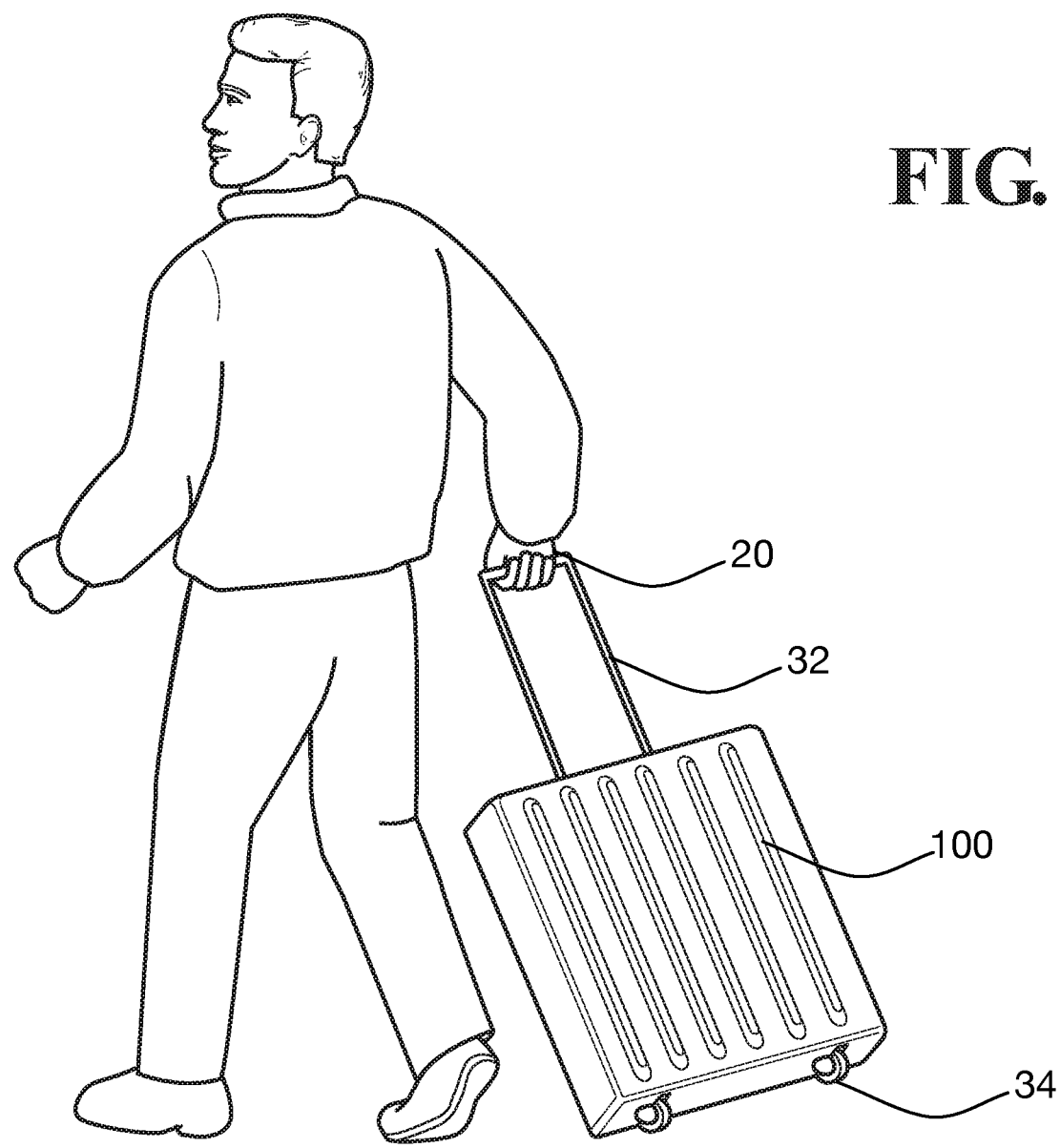
FIG. 8 illustrates the ability of the tailgate toolbox to be pulled out and rolled away for ease of transportation.

The illustration in FIG. 8 illustrates the ability of the tailgate toolbox to be pulled out and rolled away for ease of transportation. In this illustration, the embodiment of the invention shown in FIG. 6 and FIG. 7, is shown as being transported or moved about. The Handle 20 includes a Telescopic Toolbox Pull Handle 32 which is designed for pulling out and rolling the toolbox making it easy to transport. Additionally, the Tailgate Toolbox 100 is equipped with a Toolbox Rolling Wheels 34 which are the rolling apparatus that enable the toolbox to be rolled and thus facilities its transportation.

Figure 9A:
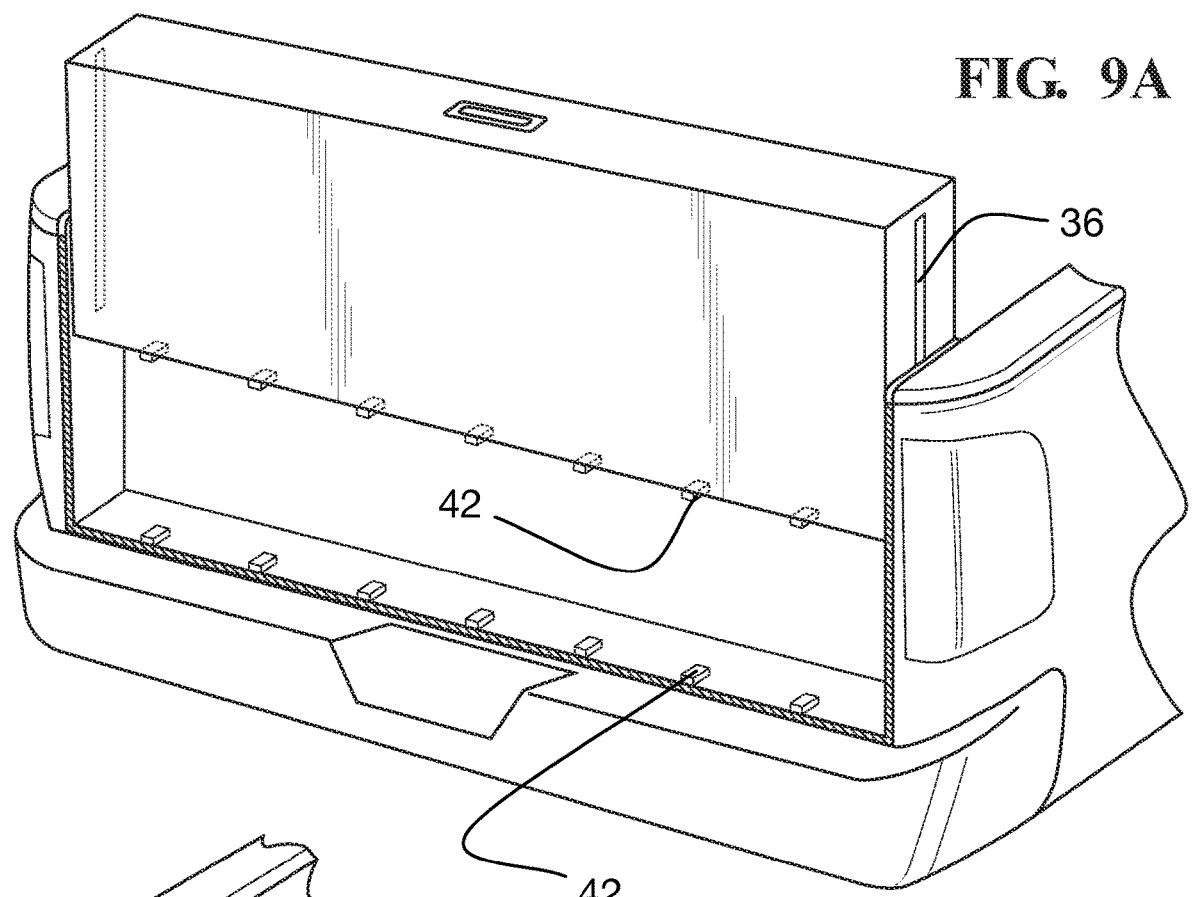
FIG. 9 illustrates the use of a guide and magnetic fasteners for securing the Toolbox into the Tailgate.
Figure 9B:
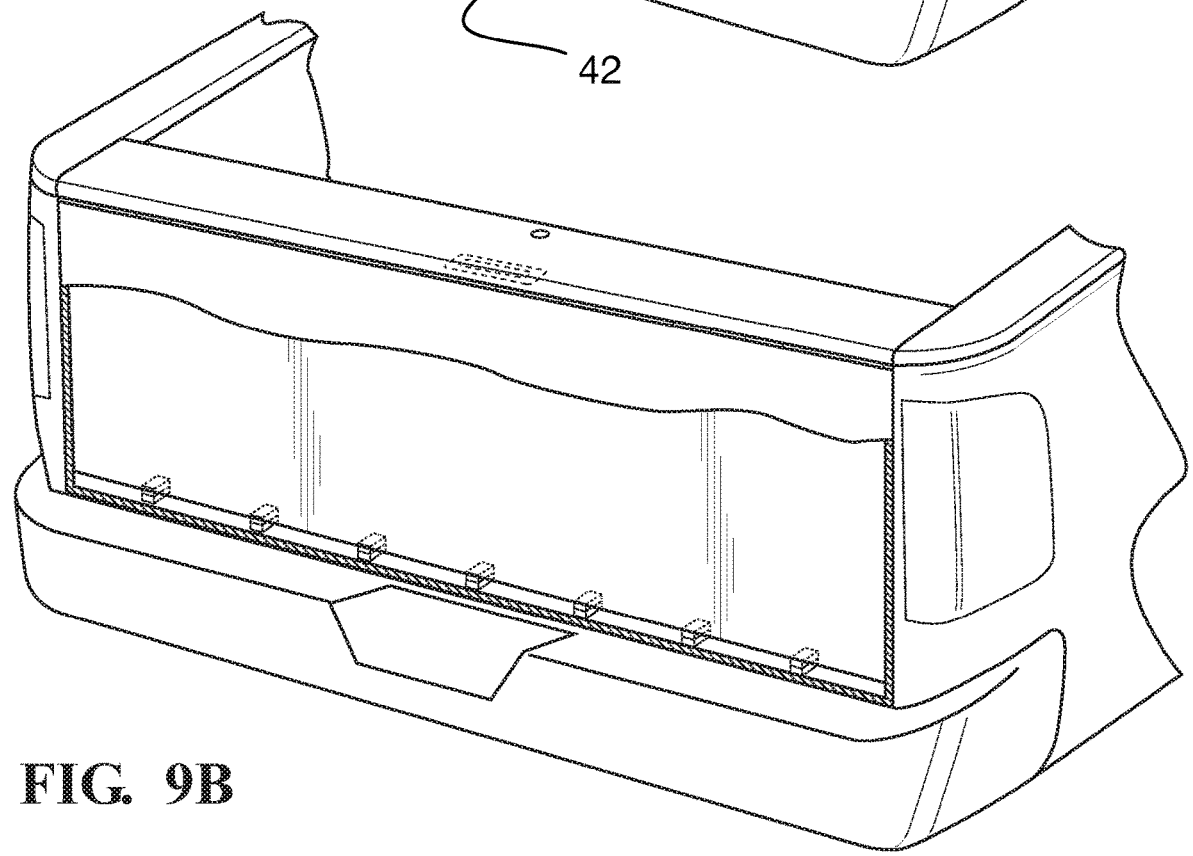

FIG. 9 illustrates the use of a guide and magnetic fasteners for securing the Toolbox into the Tailgate. FIG. 9-A illustrates the toolbox guided down to the complementary parts on the tailgate bottom; and FIG. 9-B illustrates the configuration when toolbox has been secured to the tailgate's bottom. In the embodiments of the invention the snapping means utilized are magnetic where a plurality of magnets are placed along the bottom of the tailgate cavity which are engaged by a complementary set of magnetic snapping means placed along the bottom face of the toolbox. Illustrated in this embodiment are a plurality of complementary Magnetic Fastener 42 attached both to the bottom face of the toolbox and the bottom surface of the tailgate. The toolbox is inserted into the cavity with the help of a Slide Guide 36 which enables the toolbox to be guided into the tailgate cavity.

Figure 10A:
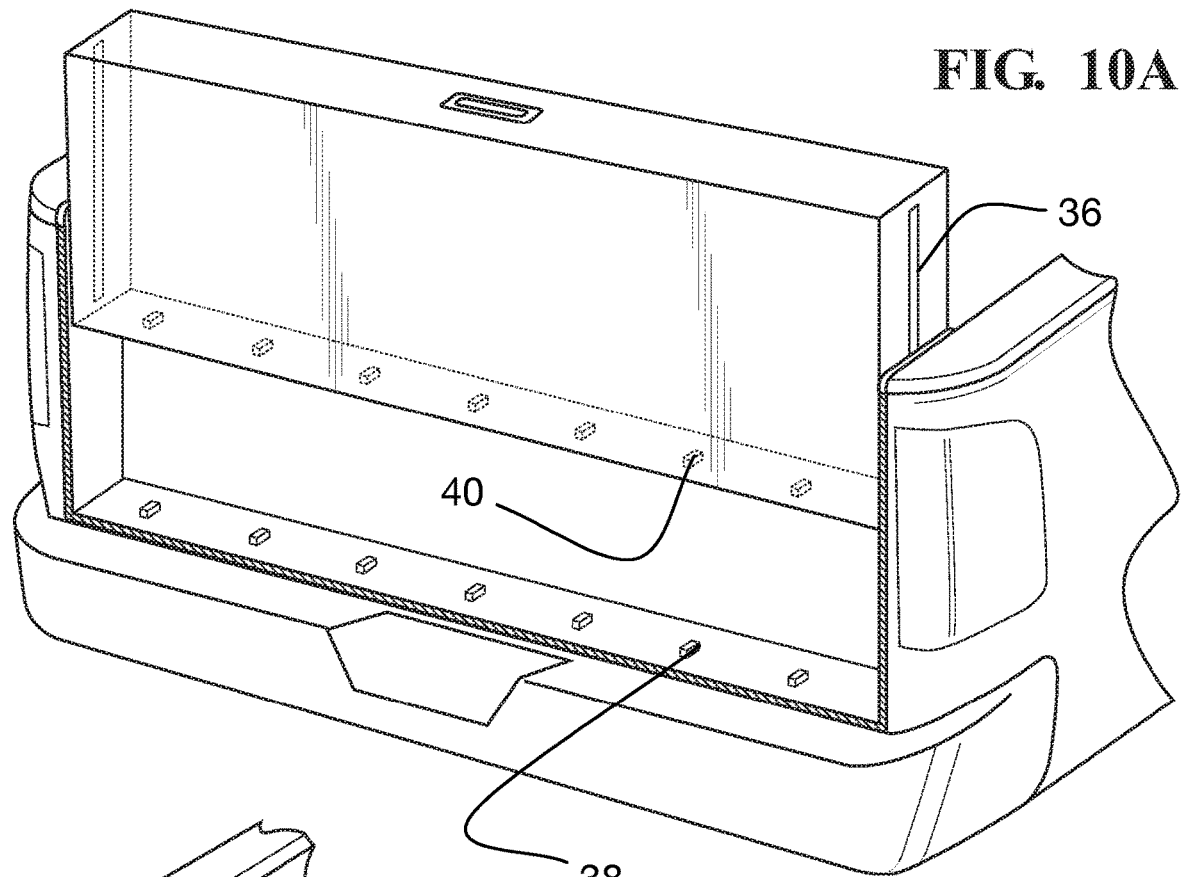
FIG. 10 illustrates the use of a guide and snap fasteners for securing the Toolbox into the Tailgate.
Figure 10B:
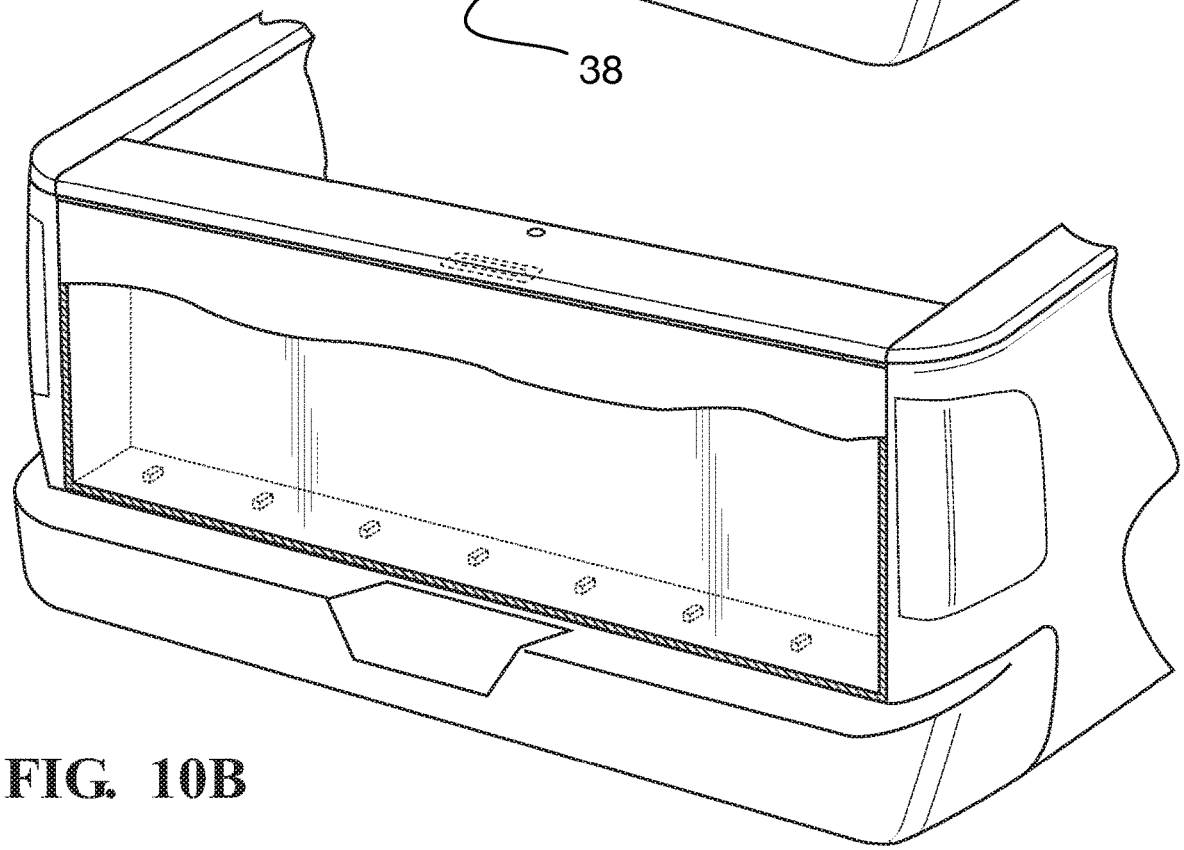

FIG. 10 illustrates the use of a guide and snap fasteners for securing the Toolbox into the Tailgate. FIG. 10-A illustrates the toolbox having the receptacle snap sockets complementary to the snap fasteners fixedly mounted on the tailgate bottom; and FIG. 10-B illustrates the configuration when toolbox has been secured to the tailgate's bottom with the snap fastener and snap sockets engaged. The snapping means disclosed in the embodiment illustrated comprise of having sockets placed along the bottom face the toolbox (the female part of the snap), and having the fastener placed along the bottom surface of the tailgate. Illustrated are the Snap Fastener 38 which is the male portion of the snap attached to the bottom surface of the tailgate and Snap Socket 40 which is the complementary female portion included on the bottom face of the toolbox. The toolbox is guided into place by Slide Guide 36.

A variety of other snapping means are possible including ball and socket type fastener, a Velcro or similar fastener, or providing a plurality of rails along the bottom surface of the tailgate that engages a complementary socket along the bottom face of the toolbox.

It will be appreciated by a skilled artisan that this process disclosed in this application is adaptable to vehicles having tailgate hutches of various shapes and sizes regardless of whether they are attached to the rear of a cargo vehicle or anywhere else. The disclosure entails making a system that is combination of the tailgate hutch that creates a cavity that is complementary to the shape of the toolbox. The process therefore lends itself to use in many situations to be encountered henceforth. The process offers the advantage of safely securing a toolbox and alleviates the need to create extra space to store it.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications, and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A tailgate apparatus of an automotive vehicle comprising
    a tailgate with an interior space housing a cavity wherein
        the cavity is accessible through an opening that spans a width of the tailgate substantially, and where
        the cavity is configured to receive a toolbox assembly insertable from the opening;
    the toolbox assembly configured to be immersed and be contained within the cavity substantially;
    wherein the toolbox assembly includes a plurality of toolbox compartments that are contiguously arranged side by side, with each compartment configured to be pulled out or inserted through the opening of the tailgate.

2. The apparatus of claim 1 wherein the opening has a detachable cover with a locking mechanism configured to lock and secure the said cover over the opening.

3. The apparatus of claim 1 wherein the toolbox assembly includes a plurality of supports configured to form a workspace table upon deployment from the cavity.

4. The apparatus of claim 3 wherein the plurality of supports comprise extendable legs are configured to adjust a multiple of elevation levels of the toolbox assembly above ground.

5. The apparatus of claim 4 where each of the toolbox compartments further includes a locking mechanism adapted to fixedly secure a lid in a closed position.

6. The apparatus of claim 4 wherein the plurality of extendable legs attached to a folding apparatus.

7. The apparatus of claim 6 wherein the supports comprise of telescopically extendable legs that are foldably attached to the toolbox assembly.

8. The apparatus of claim 1 wherein the toolbox assembly includes a plurality of charging ports further configured to supply power.

9. The apparatus of claim 1 wherein each of the plurality of toolbox compartments optionally includes a means for facilitating a transport.

10. The apparatus of claim 9 wherein the means for facilitating the transport comprise a plurality of wheels or a plurality of extendable handles or both.

11. An automotive tailgate system that includes a toolbox assembly adapted to insert into a vehicle tailgate comprising:
    the vehicle tailgate having an interior with a cavity configured to receive and accommodate the toolbox assembly where the vehicle tailgate includes an opening substantially spanning a width of the vehicle tailgate;
    the toolbox assembly toolbox spanning less than half of the width of the cavity, where the toolbox assembly is further configured to be enclosable and immersed within the vehicle tailgate,
        wherein the toolbox assembly includes a plurality of extendable supports, where the supports are configured to hold the toolbox assembly in an elevated position above ground;
    the cavity accessible through the opening that is configured to enable the toolbox assembly to slide into or slide out of the cavity and across a substantial width of the vehicle tailgate;
    the toolbox assembly is configured to be a compartmentalized toolbox.

12. The system of claim 11 where the toolbox assembly further comprises extendable supports configured to adjust an elevation level of the tailgate assembly.

13. The system of claim 11 where the tailgate opening further includes
    a rear surface having an upper edge and a lower edge,
    a front surface having an upper edge and a lower edge, where
    the front surface and the rear surface are disposed substantially parallel to each other and configured to create a tailgate cavity therein;
    the upper edge of the front surface and the upper edge of the rear surface are configured to provide the opening for insertion or removal of the toolbox assembly into and out of the cavity.

14. The system of claim 13 wherein a bottom of the tailgate opening includes a plurality of snapping means configured to engage with a plurality of complementary snapping means located on a bottom face of the toolbox assembly.

15. The system of claim 13 wherein the tailgate opening has a left side surface and a right side surface that include a plurality of guides, and where further a left side face and a right side face of the toolbox assembly includes a plurality of guides, wherein the plurality of guides of vehicle tailgate and the guides of toolbox assembly are complementary to each other; and the tailgate guides and the toolbox assembly guides are configured to guide insertion or removal of the toolbox assembly in to or out of the cavity.

16. The system of claim 11 wherein the extendable supports comprise foldable and extendable telescopic legs foldably attached to the toolbox assembly.

17. The system of claim 11 wherein the toolbox assembly includes a plurality of charging plugs configured to supply electric power.

18. The system of claim 11 wherein the toolbox assembly further includes a plurality of wheels and handle hardware, wherein handle hardware is configured to telescopically distend and communicate any force applied to the handle hardware onto the toolbox assembly thereby causing the wheels to roll and cause the toolbox assembly attached thereto to move.

19. The system of claim 11, where the toolbox assembly spans substantially a third of the width of the tailgate cavity.

20. A method of using a tailgate toolbox assembly configured to attach within a tailgate structure of an automotive vehicle comprising presenting the tailgate structure that houses an interior space that is configured to receive the toolbox assembly substantially within the tailgate structure, the interior space being accessible through an opening from a side of the tailgate structure, where the opening spans substantially a width of the tailgate structure such that the opening houses the toolbox assembly;

having the toolbox assembly including a plurality of toolbox compartments that are contiguously arranged to one another side by side, where each said compartment is configured to be pulled out or inserted through the opening of the tailgate;

having the toolbox compartments contained and removable from the interior space through the opening; and inserting or removing the toolbox compartments into or from the tailgate structure.

* * * * *